Oct. 15, 1929.  W. DUBILIER  1,731,653
ELECTRICAL CONDENSER
Filed June 1, 1925  2 Sheets-Sheet 2
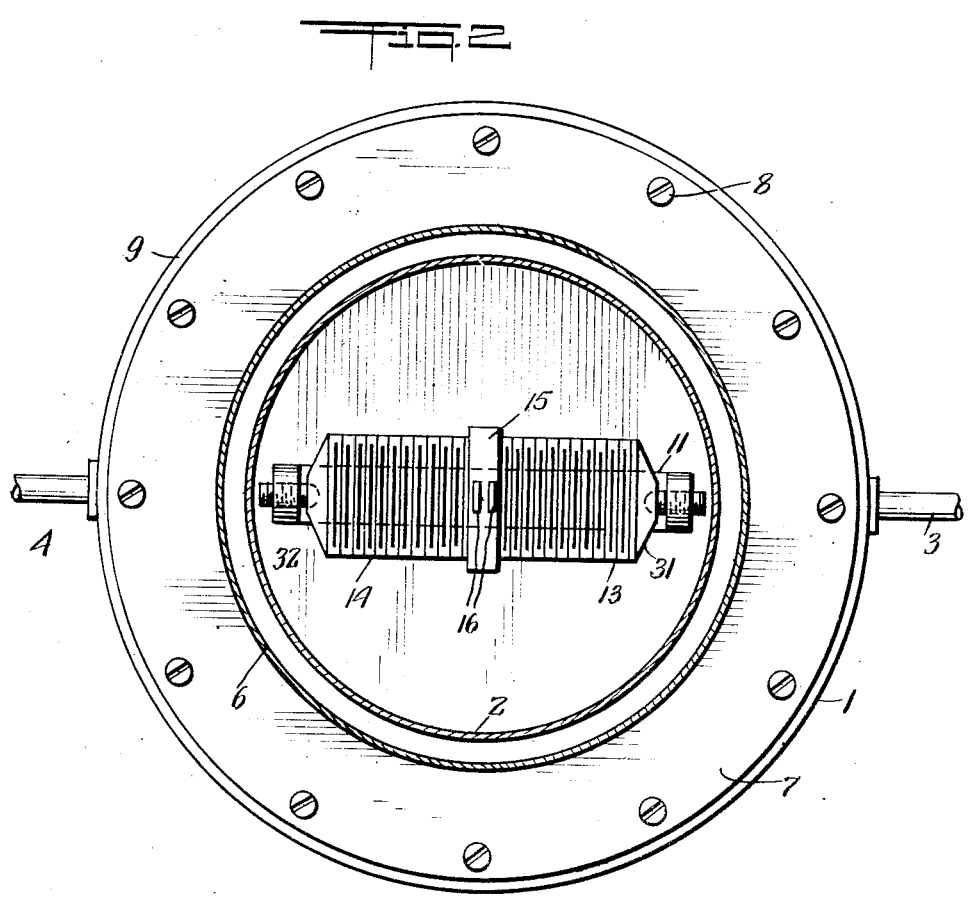
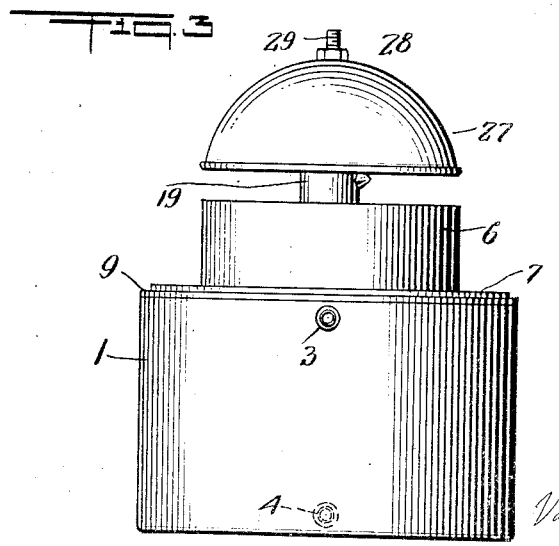
INVENTOR
WILLIAM DUBILIER
BY
Van Deventer & Hicke
ATTORNEYS Patented Oct. 15, 1929

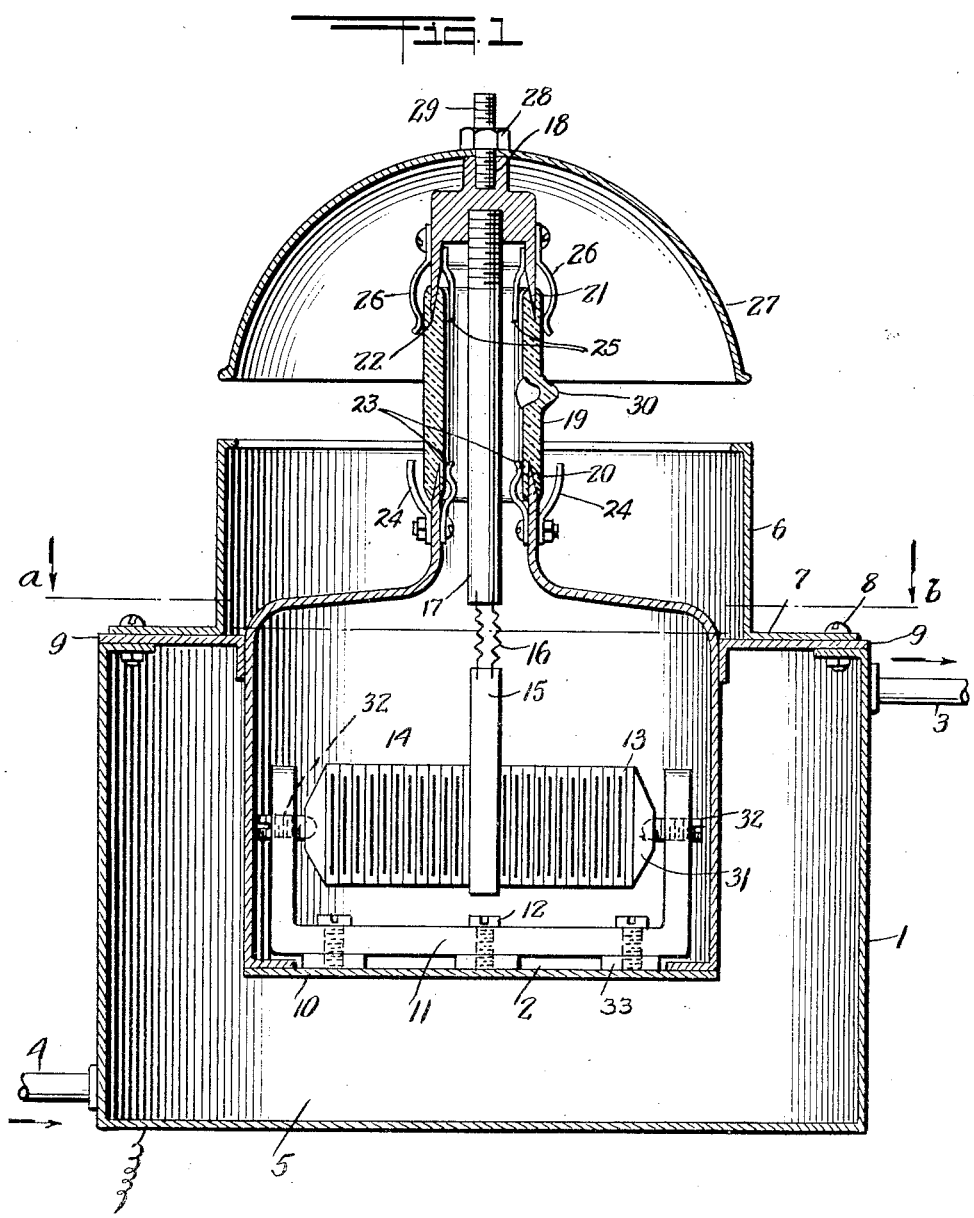

1,731,653

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed June 1, 1925. Serial No. 34,236.

This invention relates to electrical devices known as condensers, and particularly to a type of condenser to be mounted in a vacuum.

An object of this invention is to provide a condenser which is exceedingly inexpensive to produce and simple in construction, but durable and efficient in practice.

Another object of this invention is to provide a condenser in an exhausted container, which, owing to its particular formation and design, is strong and substantial, so that it properly encloses the condenser and maintains the vacuum in which the condenser is to operate.

A further object of this invention is the production of a condenser, the component parts of which can be conveniently disposed in a suitable support within an evacuated container having a closure which is adapted to be sealed in place, and carry one of the terminals by which the condenser is connected to an electrical circuit.

In the drawings:

Figure 1 is a vertical sectional view of a condenser according to my invention;

Figure 2 is a sectional view along the line a—b of Figure 1 showing the upper surface of the condenser and tips of the retaining clamp; and Figure 3 is a vertical side view of the assembled condenser in its casings, showing the safety shield and the electrostatic collar.

The same numerals identify the same parts throughout.

On the drawings 1 represents a suitable vessel or container preferably of metal, with leak proof seams and joints, which serves as a cooling tank for the flask-shaped condenser enclosing casing 2; inlet and exit pipes 3, 4, attached to the tank 1 provide for the circulating of any cooling medium such as water, oil, etc., through the space 5 between the tank and the exterior of the casing 2 upon the upper surface of the cooling tank 1, a circular metal collar 6 firmly attached by screws 8 through the flange 7 is employed for purposes to be described in full hereinafter.

The casing 2, preferably of copper, is appropriately supported and anchored in a circular aperture through the top 9 of the tank 1; and though shown as flask-shaped, this casing may have other shapes if desired. The bottom or base 10 of the casing 2 supports a clamp 11, affixed thereto by screws 12. The bottom 10 after the condenser has been properly mounted in casing 2 is hermetically sealed to the casing 2 by any usual method, for instance by electric welding. I illustrate the condenser in the clamp 11 as comprising sections 13 and 14, each section consisting of sheets or layers of copper or other heat resisting metal, separated by insulation, such as mica, and these sections are connected to a common terminal 15. The sections 13 and 14 may be, as shown in the drawing, connected in parallel or otherwise, and are firmly held together against the central terminal 15 by the ends of the compression clamp 11. Uniting terminal 15 and the head in conductor 17, are the flexible leads 16, whereby ready positioning of the rod 17 is permitted during the sealing of the casing 2. An outside terminal 18 is insulated from the flask-shaped casing 2 by insulating glass tube or sleeve 19 which is hermetically sealed to the mouth of the casing at 20; this edge being tapered if desired; and at 21 to the tapered edge 22 of the metal terminal cap 18, both joints at the ends of the sleeve being electrostatically protected by the internal and external shields 23 and 24, and 25 and 26 attached to the outside and inside of the mouth of the casing and the terminal cap 18, respectively. Into the terminal cap 18, preferably of copper, the lead rod or conductor 17 is tightly screwed and braised to make a good electric connection and shield upon this cap is placed bell-shaped shield 27 held in place by nut 28 and bolt 29, screwed into a threaded opening in the cap 18.

A protuberance 30 indicates the remnant of glass left at the point of final sealing off from the vacuum exhaust pump.

In this construction the shield 27 projects below the upper end of the sleeve 19, the smooth blunt rim of collar 6 is at a level above the lower end of the sleeve 19. Between the rims of shield 27 and collar 6 a suitable space is left which serves as a protection safety gap for the condenser. The central insulating supporting glass neck 19 is thus substantially shielded electrostatically throughout its entire extent.

The condenser has terminal blocks 31, engaged by screws 32 in the ends of the clamp 11, and is thus firmly held in the clamp. Under the clamp, penetrated by the screws 12, may be supporting blocks 33.

The interior construction and design of the body of the condenser held in the clamp 11 is not a part of this invention; and the condenser may therefore be made and its inside parts connected and arranged in various ways. The two sections 13 and 14 are firmly compressed and kept compressed in the clamp 11 but need not be waxed. The body of the condenser may simply be heated, then subjected to a vacuum, and compressed dry. It is then mounted in the clamp or holder 11 and deposited in the casing 2; and the clamp 11 fastened in place. The casing with the sleeve 19, and shield 27 in place, is then evacuated and sealed off at 30, and finally secured in the container 1. During the heating of the condenser copper foil resists to advantage the high temperature utilized in the operation.

The low tension side of the condenser is of course grounded through the casing and container.

Having described my invention, what I believe to be new and desire to secure and protect by Letters Patent of the United States is:—

1. The combination of a casing, a condenser therein, a terminal in the condenser, a conductor connected to the terminal, insulation secured by joints to the casing and the conductor to mount the latter, shields for said joints, and a shield outside the casing connected to the conductor to provide a safety spark gap.

2. The combination of a casing, a condenser in the casing, a terminal for the condenser, a conductor connected to the terminal and extending to the outside of the casing, insulation secured by joints to the conductor and the casing to mount the conductor, and shields for said joints.

3. The combination of a casing, a condenser in the casing, a terminal for the condenser, a conductor connected to the terminal and extending to the outside of the casing, insulation secured by joints to the conductor and the casing to mount the conductor, and shields for said joints, said shields being both inside and outside of the casing.

4. The combination of a casing, a condenser in the casing, a terminal for the condenser, a conductor connected to the terminal and extending to the outside of the casing, insulation secured by joints to the conductor and the casing to mount the conductor, and shields for said joints, said insulation having the form of a tubular sleeve enveloping said conductor.

5. The combination of a casing, a condenser in the casing, a terminal for the condenser, a conductor connected to the terminal and extending to the outside of the casing, insulation secured by joints to the conductor and the casing to mount the conductor, and shields for said joints, said insulation having the form of a tubular sleeve enveloping said conductor, and said shields being on both the interior and exterior of said casing.

6. The combination of a container, a casing therein, a condenser in the casing, a conductor connected to the condenser and extending to the outside of the casing and the container, a shield attached to the conductor outside the container, and a collar on the container forming with the edge of the shield a safety spark gap.

7. The combination of a flask-shaped metal casing having a neck of glass, a condenser in said casing, the condenser having a terminal, a rod secured to said terminal and enveloped by said neck, and a cap supporting the rod and closing the mouth of said neck, the cap having portions embedded in the neck and the neck being out of contact with the rod.

8. The combination of a flask-shaped casing having a glass neck, a condenser having a terminal in the casing, a conductor in said neck, a cap attached to the conductor and closing the mouth of said neck, and shields encircling the casing and the cap at the points where the neck is jointed thereto.

9. The combination of a flask-shaped casing having a glass neck, a condenser having a terminal in the casing, a conductor in said neck, a cap attached to the conductor and closing the mouth of said neck, and shields carried by the casing and the cap at the points where the neck is jointed thereto, the shields being on both the inside and outside of the neck.

10. The combination of a flask-shaped casing, a condenser having a terminal in said casing, the casing having a glass neck, a conductor fastened to the terminal and enveloped by said neck, a cap attached to the conductor and closing said neck and a shield on the cap outside of the casing, encircling the neck.

In testimony whereof I affix my signature.

WILLIAM DUBILIER.